United States Patent [19]

Plamondon et al.

[11] 4,107,120

[45] Aug. 15, 1978

[54] HETEROPOLYMER ACRYLIC LATICES AND TEXTILES TREATED THEREWITH

[75] Inventors: Joseph E. Plamondon, Holland; William R. Wilber, Quakertown; Stephen Goth, Southampton, all of Pa.

[73] Assignee: Rohm and Haas Company, Philadelphia, Pa.

[21] Appl. No.: 697,171

[22] Filed: Jun. 17, 1976

[51] Int. Cl.² ............................................. C08F 263/02
[52] U.S. Cl. .............................. 260/29.6 RB; 260/885
[58] Field of Search ........................ 260/29.6 RB, 885

[56] References Cited

U.S. PATENT DOCUMENTS

| Re. 28,682 | 1/1976 | Hoey | 428/196 |
|---|---|---|---|
| 3,457,209 | 7/1969 | Mikofalvy | 260/885 |
| 3,461,188 | 8/1969 | Baer | 260/878 |
| 3,502,745 | 3/1970 | Minton | 260/29.6 RB |
| 3,607,341 | 9/1971 | Goins | 428/314 |
| 3,713,868 | 1/1973 | Gordon et al. | 428/254 |
| 3,745,196 | 7/1973 | Lane et al. | 260/885 |
| 3,787,522 | 1/1974 | Dickie et al. | 260/885 |
| 3,793,402 | 2/1974 | Owens | 260/885 |
| 3,812,205 | 5/1974 | Dunkelberger | 260/885 |
| 3,843,753 | 10/1974 | Owens | 260/885 |
| 3,895,082 | 7/1975 | Hochberg | 260/885 |
| 3,919,451 | 11/1975 | Levy et al. | 428/336 |
| 3,985,703 | 10/1976 | Ferry et al. | 260/885 |
| 3,992,486 | 11/1976 | Lang | 260/885 |

*Primary Examiner*—Eugene C. Rzucidlo
*Attorney, Agent, or Firm*—Patrick C. Baker

[57] ABSTRACT

Low temperature properties of resin-treated textiles are improved by using as the resin an acrylic emulsion polymer wherein the latex particles have a core-shell structure. The monomers forming the core are selected to provide a $T_g$ in the core of −20° C. or lower and the monomer composition forming the shell is selected to provide a $T_g$ in the shell of about 60° C. to about −10° C. The core monomer composition contains a latent crosslinker together with an active crosslinker or a graftlinker, and the shell monomer composition contains a latent crosslinker.

7 Claims, No Drawings

HETEROPOLYMER ACRYLIC LATICES AND TEXTILES TREATED THEREWITH

BACKGROUND OF THE INVENTION

This invention relates to latex compositions and to their use with textile materials to improve the low temperature properties thereof.

Although a great variety of resin latices have been developed which are useful as finish coats, binders, adhesives, back-coatings, transfer films and interlayers for a wide variety of textile applications, there is lacking a textile resin of the acrylic latex type which provides, alone or in cooperation with other materials used in textiles, resistance to cracking at the low temperatures often encountered. For example, wearing apparel, such as clothing and shoe uppers, and particularly upholstery for automobiles, must be supple and drape well, must be impact and abrasion-resistant, and must be free from surface tack and blocking tendencies not only at room temperatures and the highest use temperatures, but also at low temperatures sometimes encountered during use, transport or storage, of the order of about $-20°$ C. and especially $-30°$ C. and lower. Textile resins are available which satisfy these requirements. However, the resins are of the plastisol or solution polymer type and are becoming less desirable due to hazards accompanying their application to fabrics (such as fire hazards due to the use of organic solvents) or upon burning of textiles containing such resins (such as dense smoke and noxious fumes).

Acrylic polymer latices have outstanding advantages over plastisol and solution polymer resin systems as textile resins. Their all-aqueous nature permits excellent handling ease. They provide good hand, strength, durability, low hazard and low cost without external plasticizers. Moreover, they are compatible with a variety of additives, colorants and other textile coating materials. Nevertheless, an ability to impart low temperature properties to textiles has not been achieved. One measure of significant low temperature acceptability is a "cold crack" temperature of $-30°$ C. or lower. Cold crack measurements reflect the ability of a textile material treated with a textile resin to withstand cracking upon impact or folding at low temperatures. However, it will be appreciated that even if a resin imparts good cold crack to a textile material, the resulting treated textile must also be acceptable from several other standpoints, particularly low surface tack, impact and abrasion resistance, and good flexibility at all use temperatures. The achievement of a suitable balance among all of these properties is largely empirical and is not predictable on the basis of achievement of any one or even several of the properties.

SUMMARY OF THE INVENTION

In general terms, superior cold crack is achieved in combination with other properties required in resin-treated textiles by treating a textile material with a thermosetting acrylic latex composition wherein the latex particles comprise about 30–60%, preferably 45–55%, by weight of a polymeric core and about 70–40%, preferably 55–45%, by weight of a polymeric shell. The core is formed by emulsion polymerization of a first monomer composition consisting essentially of a) a major amount of a principal monomer system, b) a minor amount of a crosslinking monomer system comprising (1) at least about 0.5% by weight on the total monomer composition of a graftlinking monomer or an active crosslinking monomer and (2) at least about 4% by weight on the total monomer composition of a latent crosslinking monomer. The shell is formed on the core by emulsion polymerization of a second monomer composition in the presence of the core polymer, the second monomer composition consisting essentially of a) a major amount of a principal monomer system and b) a minor amount of a latent crosslinking monomer system. The monomers of the first monomer composition are selected in a known manner to provide a glass transition temperature ($T_g$) in the core of $-20°$ C. or lower, and the monomers of the second monomer composition are selected in a known manner to provide a $T_g$ in the shell of about 60° C. to about $-10°$ C.

Textiles of all types are beneficially treated with the acrylic polymer latices in accordance with the invention. Application techniques include direct coating, transfer film application, lamination or any other technique known in the art.

In this specification the term "acrylic" is used in a general sense to describe polymers wherein at least one of the monomers is of the acrylic or methacrylic type, including acids, esters, amides and substituted derivatives thereof.

DETAILED DESCRIPTION

The monomers forming the polymeric core of the heteropolymer are selected to provide a glass transition temperature ($T_g$) in the core of $-30°$ C. or lower. It is believed that the resulting rubbery character of the core in cooperation with the crosslinking character of core and shell results in the cracking resistance and flexibility at room temperature and low temperature as well as the impact resistance provided by the finished polymer.

The core polymer is formed by emulsion polymerization of a first monomer composition comprising a major amount of a principal monomer sytem and a minor amount of a crosslinking monomer system. The principal monomer system typically contains a $C_1$-$C_8$ alkyl acrylate wherein the alkyl group is straight or branched chain, such as ethyl acrylate, butyl acrylate, 2-ethylhexyl acrylate, and mixtures thereof. Part of the alkyl acrylate, up to a maximum of about 20% by weight, may be replaced with a non-crosslinking (with respect to the alkyl acrylate) monoethylenically unsaturated monomer having alpha, beta-unsaturation. Examples of such other monomers are vinylidene chloride, vinyl chloride, acrylonitrile, vinyl esters such as vinyl formate, vinyl acetate and vinyl propionate, and mixtures of ethylene and such vinyl esters, alkyl methacrylic esters, acrylic and methacrylic acid esters of alcohol-ethers such as diethylene glycol monoethyl or monobutyl ether, styrene, ring-alkyl styrenes such as ortho-, meta and paramethyl styrenes, alpha-alkyl styrenes such as alpha-methyl styrene and the like, mixtures of ethylene with other alpha olefins such as propylene, butylene, pentene and the like, and combinations of ethylene with vinyl ethers such as methyl vinyl ether, ethyl vinyl ether, vinyl 2-methoxylethyl ether, vinyl 2-chloroethyl ether and the like.

Of the foregoing monomers, butyl acrylate is particularly preferred along or in combination with minor amounts of methyl methacrylate, of the order of about 70–95% by weight of butyl acrylate and about 1–15% by weight of methyl methacrylate, based on the total weight of the monomers in the monomer composition forming the core polymer.

Careful selection of the crosslinking monomer system both in the core monomer composition and in the shell monomer composition is important for obtaining the proper balance of properties in fabrics treated with the heteropolymer. The crosslinking monomer system in the monomer composition forming the core comprises:
1. At least about 0.5% (for example, 1-6%) on total monomer composition weight of a graftlinking monomer or an active crosslinking monomer, and
2. At least about 4% (for example, 4-10%) on total monomer composition weight of a latent crosslinking monomer.

Generally, the amount of graftlinking or active crosslinking monomer in the core monomer composition should be that which will provide sufficient mutual insolubility of the core and shell polymer compositions for formation of a true heteropolymer and which will not unduly reduce the elongation properties of the heteropolymer. This will depend, of course, on other monomers in the monomer compositions of both core and shell, and may be varied accordingly.

The shell monomer composition requires only a latent crosslinker. Upon polymerization of the shell monomer composition in the presence of the core polymer, the shell polymer composition becomes intimately associated with the core, if not actually graftlinked, through the condensation reactions possible with the latent crosslinking monomers present in the core and shell polymer compositions. It appears that the shell contributes significantly to the good abrasion-resistance, dryness (little or no tack) solvent resistance and launderability of the textiles treated with the heteropolymer by virtue either of graftlinking of the shell polymer onto the core polymer or of tight formation of the shell over the core short of actual graftlinking.

For the purposes of this description, the term "latent crosslinking monomer" means a polyfunctional monomer wherein a portion of the functionality enters into the copolymerization with other monomers in the monomer composition forming the core or the shell, the residual functionality causing crosslinking of the polymeric core or shell upon subsequent complete drying of the latex particles on a textile substrate material treated therewith. Generally, such latent crosslinking monomers are amides or N-alkylolamides of alpha, beta-ethylenically unsaturated carboxylic acids having 4-10 carbons, such as acrylamide, methacrylamide, N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide and the like, and others. The preferred monomers of the N-alkylol amide type, because of their ready availability and relative low cost, are the N-alkylol amides of alpha, beta-monoolefinically unsaturated monocarboxylic acids, such as N-methylol acrylamide and N-methylol methacrylamide. Other preferred latent crosslinking monomer systems are mixtures such as equimolar mixtures of acrylamide and N-methylol acrylamide or of methacrylamide and N-methylol methacrylamide. The latent crosslinking monomers are known to impart self-curing characteristics to compositions containing them. The cure may be enhanced by reaction with an active hydrogen containing resin added to coating formulations containing the core or shell monomer compositions or the heteropolymers, such as the triazine-formaldehyde and ureaformaldehyde resins. In either case, full cure occurs upon complete drying of the compositions on the textile substrates treated therewith.

By the term "active crosslinking monomer" is meant a polyfunctional monomer which crosslinks a polymer composition during the initial formation thereof. Subsequent drying or other curing techniques are not required. Monomers of this type are well-known and comprise monomers wherein the functionality is of substantially equivalent reactivity so that uniform crosslinking occurs. Typically, such monomers contain at least two addition polymerizable vinylidene groups and are alpha, beta-ethylenically unsaturated monocarboxylic acid esters of polyhydric alcohols containing 2-6 ester groups. Suitable preferred active crosslinking monomers include alkylene glycol diacrylates and dimethacrylates such as ethylene glycol diacrylate, 1,3-butylene glycol diacrylate, 1,4-butylene glycol diacrylate propylene glycol diacrylate, triethylene glycol dimethacrylate, etc.; 1,3-glycerol dimethacrylate, 1,1,1-trimethylol propane dimethacrylate, 1,1,1-trimethylol ethane diacrylate, pentaerythritol trimethacrylate, 1,2,6-hexane triacrylate, sorbitol pentamethacrylate, etc. Other useful crosslinkers include methylene bisacrylamide, methylene bismethacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, hexatriene, diallyl cyanamide, ethylene glycol divinyl ether, diallyl phthalate, divinyl dimethyl silane, glycerol trivinyl ether, divinyl adipate, etc.

By "graftlinking monomer" is meant a polyfunctional monomer wherein the functionality has different reactivity. This results in a portion of the functionality entering into the formation of the core polymer and the remaining functionality being pendant from the core polymer and capable of reacting with suitable functionality of the shell monomer composition to graft the shell upon the core polymer. Typically, the graftlinking monomers have at least two copolymerizable ethylenically unsaturated bonds which react at substantially different rates and comprise allyl esters of alpha, beta-unsaturated mono- and dicarboxylic acids having terminal ethylenic unsaturation. Typical useful esters include allyl methacrylate, allyl acrylate, diallyl maleate, diallyl fumarate and diallyl itaconate.

The monomers of the composition forming the shell polymer may be the same as the monomers of the core polymer composition or may be different, provided the glass transition temperature in the shell is about 60° C. to about −10° C., preferably about 25° C. to about −10° C. A $T_g$ in the shell higher than this range makes the heteropolymer unsuitable for use in the treatment of textiles due to stiff or papery hand and poor flexibility. A $T_g$ in the 25° C. to 60° C. range, although somewhat harder than necessary for many applications or locations, may be tolerable in warmer or continuously hot climates.

The amount of latent crosslinking monomer or monomers of the second shell monomer composition is at least about 2% by weight, based on the total weight of the second monomer composition. A useful range is 2-10%, preferably 5-8%.

The $T_g$ of the core polymer composition and shell polymer composition are determinable in a known manner either experimentally or by calculation. The method of calculating the $T_g$ based upon the $T_g$ of homopolymers of individual monomers is described by Fox, Bull. Am. Physics Soc. 1, 3, page 123 (1956). Examples of the $T_g$ of the homopolymers which permit such calculations are the following:

| HOMOPOLYMER OF | $T_g$ |
|---|---|
| n-octyl acrylate | −80° C. |
| n-decyl methacrylate | −60° C. |
| 2-ethylhexyl acrylate | −70° C. |
| octyl methacrylate | −20° C. |
| n-tetradecyl methacrylate | 9° C. |
| methyl acrylate | 9° C. |
| n-tetradecyl acrylate | 20° C. |
| methyl methacrylate | 105° C. |
| acrylic acid | 106° C. |

Monomers may be selected to obtain the appropriate $T_g$ through use of the "Rohm and Hass Acrylic Glass Temperature Analyzer," publication CM-24L/cb of Rohm and Haas Company, Philadelphia, Pennsylvania.

The heteropolymer compositions are prepared by emulsion polymerization techniques based on a two-stage polymerization and gradual addition of the monomer emulsions in each of the two stages. While it is advantageous to initiate and catalyze the reaction in each stage in a conventional manner, wherein the initiator is activated either thermally or by a redox reaction, thermal initiation is preferred from the standpoint of better storage stability of the resulting polymer emulsion and balance of properties as a textile treating resin. The latex particle size should be relatively small, of the order of about 300 nm or less, preferably about 150–200 nm. As is well-known, given the same polymer backbone, particle size is controlled primarily by the type and level of emulsifier used in each stage of the emulsion polymerization. Molecular weight of the heteropolymers generally is of the order of about 70,000 to 2,000,000, preferably about 250,000 to 1,000,000.

The foregoing and other aspects of two-stage heteropolymer emulsion polymerization are well-known as described, for example, in U.S. Pat. Nos. 3,812,205, 3,895,082, 3,461,188 and 3,457,209 except for the critical monomer selection described herein.

Among the great variety of principal monomer compositions useful for forming the core polymer are the following compositions where the monomers total 91%:
76–91 BA/0–15 MMA
76–91 BA/0–15 AN
76–91 BA/0–15 St
46–91 BA/0–45 EA
74–91 BA/0–17 EMA
74–91 BA/0–17 HEMA
74–91 BA/0–17 HPMA
55–91 EHA/0–36 AN
55–91 EHA/0–36 MMA
56–86 BA/0–25 EA/0–10 MMA
70–91 BA/0–21 VA
46–91 BA/0–45 VCl$_2$
26 E/66 VA
58 Bd/33 St The crosslinking monomer systems for use with any of the foregoing monomer systems include the following where the monomers total 9%:
4–8 MAM/1–4 AlMA/0–2 IA
4–8 NlMAM/1–4 AlMA/0–2 IA
4–8 MlMAM/1–4 EDGDMA/0–2 IA
4–8 MlAM/1–4 EGDMA/0–2 IA
4–8 MlMAM/1–4 BDM/0–2 IA
4–8 MlAM/1–4 BDM/0–2 IA Principal monomer systems for preparation of the shell polymer include the following where the monomers total 92%:
47–67 BA/25–45 MMA
47–67 BA/25–45 AN
47–67 BA/25–45 St
70–91 EA/1–22 MMA
40–65 BA/27–52 EMA
40–65 BA/27–52 HEMA
40–65 BA/27–52 HPMA
32–50 EHA/41–60 AN
32–50 EHA/41–60 MMA
27–47 BA/10–50 EA/15–35 MMA
50 BA/42 VA
15 E/77 VA
50 EA/42 VCl$_2$
40 Bd/52 St Crosslinking monomer systems for use within the shell monomer composition include the following monomers (total 6–8%):
6–8 MlMAM/0–2 IA
6–8 MlAM/0–2 IA
2–6 MlMAM/6–2 MAM/0–2 IA
2–6 MlAM/6–2 AM/0–2 IA The above monomer abbreviations have the following meanings:

| BA | butyl acrylate | MMA | methyl methacrylate |
|---|---|---|---|
| St | styrene | EMA | ethyl methacrylate |
| VA | vinyl acetate | HEMA | hydroxyethyl methacrylate |
| E | ethylene | EHA | 2-ethylhexyl acrylate |
| Bd | butadiene | HPMA | hydroxypropyl methacrylate |
| IA | itaconic acid | VCl$_2$ | vinylidene chloride |
| AM | acrylamide | BDM | butylene dimethacrylate |
| AN | acrylonitrile | AlMA | allyl methacrylate |
| EA | ethyl acrylate | EGDMA | ethylene glycol dimethacrylate |
| MlMAM | N-methylol methacrylamide | MAM | methacrylamide |
| MlAM | N-methylol acrylamide | | |

A preferred heteropolymer is prepared from a first monomer composition comprising:
70–95% by weight of a $C_1$–$C_8$ alkyl acrylate,
0–15% by weight of a $C_1$–$C_8$ alkyl methacrylate,
4–10% by weight of acrylamide or methacrylamide,
1–5% by weight of allyl methacrylate, and
0–2% by weight of itaconic acid;
and a second monomer composition comprising:
40–70% by weight of a $C_1$–$C_8$ alkyl acrylate,
20–50% by weight of a $C_1$–$C_8$ alkyl methacrylate
2–10% by weight of N-methylol acrylamide, N-methylol methacrylamide, or a mixture of acrylamide and N-methylol acrylamide, or a mixture of methacrylamide and N-methylol methacrylamide, and
0–2% by weight of itaconic acid.

The heteropolymer latices of the invention may be applied to any form of textile fabric to obtain a wide variety of useful textile articles. In one end-use application, the heteropolymer is used as a cast transfer film which is laminated with an adhesive to a suitable fabric substrate in the manufacture of upholstery materials. The adhesive in such case may be a known adhesive useful for adhering acrylic films to fabrics or, preferably, it is a foam which is applied to the fabric substrate in the form of a foamed acrylic latex.

One such foam is a latently crosslinkable acrylic polymer latex based on monomers providing a suitable $T_g$ so that the foam will not unduly stiffen the fabric. The acrylic polymer latex may be mechanically frothed or the foam may be generated by the addition of a foaming agent. The foam preferably also contains a foam stabilizer and is applied to the fabric at a wet foam thickness of about 10–150 mils and dried out without causing crosslinking. During drying the foam may shrink up to about 30% or more, depending on its wet density. The foam is then crushed to a thickness of about 5–25% of its dry thickness or crushing may be postponed until after application of the heteropolymer top film.

Such top film normally is formed by depositing the thermosettable heteropolymer latex onto release paper, drying the composition without thermosetting, positioning the film while still on the release paper over the foam, and then laminating the fabric, foam and top film together at a suitable pressure and temperature to cause crushing, consolidation and thermosetting of the materials together. Preferably the release paper is removed before lamination. The heteropolymer film thus provides a highly effective wear layer over the crushed foam. A top film thickness of the order of about 0.1–5 mils, preferably about 1.5–2.5 mils, is suitable for this purpose.

The foregoing and other details of laminated textile fabrics, where a heteropolymer of this invention may be used as a top film over a crushed foam, are set forth in U.S. Reissue Pat. No. 28,682 to Hoey, reissued Jan. 13, 1976.

Cast heteropolymer films of the invention may also be adhered to suitable fabric substrates by other types of adhesives, foamed or non-foamed. Such adhesives are well-known in the art and include various other acrylic polymers such as acrylonitrile and non-acrylics such as styrene/butadiene, polyvinyl chloride, polyvinyl acetate, vinyl chloride/ethylene copolymers, various urethane-type polymers, and the like. Foamed adhesives are generally preferred, and of these the water-based types are particularly preferred, due to less penetration of the fabric substrate, which penetration might result in undue stiffening of the fabric.

The heteropolymer latices of the invention are also useful for direct application in a foamed or non-foamed state to various types of fabric substrates including wovens, non-wovens and knitted fabrics. The latex may be applied to the fabrics in any suitable manner, such as by spraying, dipping, roll transfer, knife coating or the like. In the case of treatment of non-wovens, similar techniques known in the art may be employed, such as the procedures, fabrics and devices described in U.S. Pat. No. 3,157,562. A concentration of polymer in the latex of about 10–70% by weight, preferably about 40–60%, is suitable.

U.S. Pat. Nos. 3,607,341 and 3,713,868 further illustrate applications of foamed acrylic latex compositions for textile treatment wherein substitution therefor of the heteropolymers of the present invention will provide improved low temperature properties.

The heteropolymer latices of the invention are also useful as finish coats for leather or leather-like fabric substrates by direct application of the latices to the substrates or by use over a crushed foam in the manner of U.S. Pat. No. 3,919,451. The heteropolymer in the latter case may also constitute the polymer of the foam interlayer.

Whether used as an interlayer or as a toplayer, the heteropolymers of the invention may be topcoated with various materials for further improvements such as elimination of any residual tack or tendency to grab or to soil. Such topcoats are well-known, particularly in the leather finishing art, and generally comprise polymeric materials of relatively hard character. The topcoat resins may be latices or organic solvent based topcoats of any of the known types, including acrylics, urethanes, polyvinyl chlorides, cellulose acetate butyrates, and combinations thereof.

The heteropolymer dispersions may contain any additives useful for improving varius properties, such as ultraviolet light stabilizers, silicone release acids, defoamers, pigments, leveling agents, thickening agents, preservatives, heat or foam stabilizers, and the like.

The following examples further illustrate the invention. All parts and percentages are by weight, unless otherwise indicated.

EXAMPLE 1

PREPARATION OF HETEROPOLYMER EMULSION

The following monomer emulsions I and II are prepared:

|  | Monomer Emulsion | |
|---|---|---|
|  | I | II |
| Sodium lauryl sulfate (28%) | 36.9 g. | 36.9 g. |
| Water | 498.0 ml. | 269.0 ml. |
| Methacrylamide (MAM) | 76.16 g. | — |
| M-methylol methacrylamide (25%) (MIMAM) | — | 304.64 g. |
| Itaconic Acid (IA) | 10.88 g. | 10.88 g. |
| Butyl acrylate (BA) | 935.68 g. | 620.16 g. |
| Methyl methacrylate (MMA) | 54.4 g. | 380.80 g. |
| Allyl methacrylate (AlMA) | 10.88 g. | — |

To a suitable reaction vessel is added 3.885 g. sodium lauryl sulfate (28%) and 625 ml. water. The mixture is heated to 80° C. with a nitrogen flush. A gentle nitrogen blanket is maintained during the entire following polymerization. To the mixture is then added a catalyst solution of 3.81 g. sodium persulfate in 26 ml. water. Polymerization begins and the temperature rises about 5° C. About 5–10 minutes later, monomer emulsion I and 122 ml. of a catalyst solution of 3.81 g. sodium persulfate in 244 ml. water are gradually added over 1 ½ hours at 80°–86° C. After the addition the batch is held at 80°–85° C. for one hour. Monomer emulsion II is then added together with the balance of the catalyst solution over 1 ½ hours at 80°–86° C. The reaction is held 30 minutes at 80°–86° C. followed by cooling to 55° C. and the addition of a first chaser catalyst solution containing 10 ml. of 0.15% $FeSO_4.7 H_2O$, 1.0 g. t-butyl hydroperoxide in 7 ml. water and 0.87 g. sodium formaldehyde sulfoxylate in 17 ml. water. About a 1° C. exotherm occurs. 15 minutes later, a second chaser catalyst solution (same as first chaser except for absence of $FeSO_4.7 H_2O$ solution) is added. A third chaser catalyst solution (same as second chaser) is added 15 minutes later and the reaction mixture is held for 15 minutes, cooled and filtered.

The resulting heteropolymer latex is characterized as follows:
Composition:

Core polymer: BA/MMA/MAM/ALMA/IA, 86/5/7/1/1 (wt. %)
Shell polymer: BA/MMA/ M1MAM/IA, 57/35/7/1/ (wt. %)
Core/Shell weight ratio: 50/50
Solids: 48.8%

EXAMPLES 2-3

Polymer emulsions were prepared having the following compositions (Table 1) where the monomer abbreviations are as identified in Example 1 and EGDMA is ethylene glycol dimethacrylate. Preparation was substantially as described in Example 1 above (thermal) except for Example 3 which was a redox process.

TABLE 1

| Ex. No. | Pooymer Composition (Core//Shell) | % Solids | Core/Shell Ratio(%) |
|---|---|---|---|
| 2 | 85 BA/3 MMA/4 EDGMA/7 M1MAM/ 1 IA//57 BA/35 MMA/7 M1MAM/ 1 IA | 48.9 | 50/50 |
| 3 | 86 BA/5 MMA/1 A1MA/7 MAM/ 1 IA//57 BA/35 MMA/7 M1MAM/ 1 IA | 50.0 | 40/60 |

EXAMPLE 4

A. PREPARATION OF FABRIC SAMPLES

The polymer emulsions of Examples 1-3 are each applied to a textile fabric in the following manner:

The acrylic polymer emulsion is adjusted to 50% solids, cast onto a silicone-coated release paper and dried for 2 minutes at 180° F to give a dry film 2 mils in thickness.

An acrylic polymer emulsion of the composition 96 butyl acrylate, 2 acrylamide and 2 N-methylol acrylamide is prepared and compounded in the following formulation having a total solids content of 46.8%:

| | INGREDIENT | SOLIDS |
|---|---|---|
| Polymer emulsion | 200 | 92 |
| Titanium dioxide | 25 | 25 |
| Melamine-formaldehyde resin (Aerotex MW, American Cyanamid Co.) | 4.6 | 3.7 |
| Ammonium Stearate | 14 | 4.6 |
| Water | 20 | — |
| Ammonium hydroxide (28%) | 4 | — |
| | 267.6 | 125.3 |

Foams are prepared from the foregoing formulation by whipping air into the formulation using a Kitchenaid Mixer (Model C) to a wet density of 0.15 g./cm³. The foam is then cast onto a cotton twill fabric to a 60 mils wet thickness and dried 5 minutes at 250° F. The 2 mil precast film on release paper is then placed film side down onto the dried foam, and the entire assembly is crushed and laminated between embossing plates for 3 seconds at 180° F. and under a pressure of 30 tons. The release paper is then peeled off and the composite cured for 5 minutes at 300° F. The result is a crushed foam coated textile fabric having as a top film a heteropolymer emulsion polymer of Examples 1-3.

B. PROPERTIES OF FABRIC SAMPLES

The fabric samples prepared as above each had the hand, drape and impact resistance required for textile use and were particularly suited for use in transportation (upholstery) fabrics due to the following combination of properties:

TABLE 2

| Fabric Sample | Polymer Ex. No. | Surface Tack[1] | Bally Flex[2] | Taber Abrasion[3] | Cold Crack[4] |
|---|---|---|---|---|---|
| A | 1 | 2 | ≧100,000 | Excellent | −35° C |
| B | 2 | 2 | ≧100,000 | Excellent | −35° C |
| C | 3 | 1 | ≧100,000 | Excellent | −35° C |

TEST PROCEDURES (1) Tack: A 5 inch by 5 inch sample is folded face to face and diagonally to form a triangle. A weight which produces a force of 1 psi is placed on the sample and left in a 140° F. oven for 16 hours. The sample is then taken from the oven, the weight is removed and the sample is allowed to cool for 30 minutes. The sample is gripped by one corner and rated as follows wherein values of 0, 1 and 2 indicate acceptability:

0 = no tack, sample unfolds under own weight.
1 = sample unfolds with a shake
2 = sample easily pulled apart
3 = moderate sticking
4 = heavy sticking
5 = severe sticking - sample damaged (2) Bally Flex: A room temperature flexibility test as described in Society of Leather Technologists and Chemists, Method SLP-14. The data represents the number of cycles survived by the sample. 100,000 or more cycles indicates excellent performance.

(3) Taber Abrasion: ASTM D-1175-71, using an H-18 wheel, 500 gm. weight, 1000 cycles. A loss of 200 mg. or less in apparel and upholstery uses is acceptable. A los of 100 mg. or less in shoe uppers is acceptable.

(4) Cold Crack: ASTM D-1790-62 modified as follows: A 1 inch × 3 inch sample is placed in a cold box and allowed to come to equilibrium at 30° F. A loop is formed with the heteropolymer film side facing out, and a 4 lb. weight is dropped 9 inches onto the edge of the loop. The sample is examined for cracks. The temperature is lowered in 10° F. increments until failure occurs. The lowest temperature at which the sample passes is recorded as the cold crack temperature.

EXAMPLE 6

DIRECT COATING OF CRUSHED FOAM COATED FABRIC

A fabric sample is prepared as described in Part A of Example 5 except for absence of the pre-cast heteropolymer top film. However, the acrylic polymer foam (about 45 mils wet thickness) is dried and crushed to a thickness of about 8 mils. A heteropolymer emulsion such as described in Example 1 is then thickened with Acrysol ASE-60 acrylic thickener to a viscosity of about 3000 cps., and a 5 mil wet coating of the emulsion is applied to the crushed foam. The coating is dried 5 minutes at 240° F. and cured for 5 minutes at 300° F. The resulting product is useful as furniture upholstery or other synthetic textile application.

EXAMPLE 7

TRANSFER COATING OF FABRIC WITHOUT CRUSHED FOAM

A silicone-coated release paper is knife-coated over a roll with a polymer emulsion such as described in Examples 1-3 to a wet thickness of 4-5 mils. The coating is dried to a B stage and film thickness of about 2 mils in a three zone oven with temperatures set as follows: Zone 1, 170° F.; Zone 2, 190° F.; and Zone 3, 240° F. Using a three roll reverse roll coater, an acrylic polymeric polymeric emulsion (Rhoplex TR-934 polymer emulsion thickened to a viscosity of 10,000 cps) is applied to the dried film as an adhesive. A napped and sheared fabric is then placed on the wet adhesive, nap side down, and the composite is laminated at 60-80 psi pressure. The composite is then dried and cured in a second, three zone oven using the following temperatures: Zone 1, 220° F.; Zone 2, 280° F.; and Zone 3, 330° F. The release paper is thereafter stripped away and the composite rolled up. The resulting coated fabric is suitable for upholstery, handbag and other simulated leather uses and exhibits a coldcrack of −20° F.

EXAMPLE 8

LEATHER COATING

A corrected grain upholstery leather stock is treated with a standard, commercially available basecoat formulation and dried for one hour at 120° F. A polymer emulsion such as described in Examples 1-3 is formulated as follows:

| | |
|---|---|
| Polymer Emulsion | 80 parts |
| Water | 16 |
| Leveller MA-65 | 2 |
| Leveller MK-1 | 1 |
| Ammonium hydroxide (28%) | 1 |
| Silicone Emulsion | 8 |

The compounded emulsion is then applied to the base-coated leather by spraying twice and is dried for 1 hour at 120° F. after each spraying. A total coating weight of about 2 g./ft.$^2$ solids is obtained. The coated leather sample is then embossed with a hair cell print at 500 psi pressure, 250° F. and 3 seconds dwell time.

EXAMPLE 9

NON-WOVEN BINDER APPLICATION

A polymer emulsion such as described in Examples 1-3 is diluted to 15% solids content and 0.5% ammonium nitrate catalyst is added. The latex is applied to a carded, non-woven rayon web, prebonded with a small quantity of polyvinyl alcohol and weighing about 0.5 g./yd.$^2$, by padding (saturation) on a Birch Brothers Padder operating at 30 psig and about 7 yds./min. Wet pick up of the emulsion is about 150%. After drying at room temperature the fabric is cured at 300° F. for 2 minutes. The resulting product is suitable for use as an interliner. If the add-ons of emulsion solids are lower (<100%), the product is suitable for applications such as diaper cover stock and sanitary napkins.

We claim:
1. A textile treating composition consisting essentially of an acrylic latex, the particles of which comprise about 30-60% by weight of a polymeric core and about 70-40% by weight of a polymeric shell, wherein said core is formed by emulsion polymerization of a first monomer composition consisting essentially of:
 (a) a major amount of a principal monomer system, and
 (b) a minor amount of a crosslinking monomer system comprising:
  (i) about 0.5% to 6% by weight on the total first monomer composition of a graftlinking monomer or an active crosslinking monomer, and
  (ii) about 4% to 10% by weight on the total first monomer composition of a latent crosslinking monomer;
and wherein said shell is formed on said core by emulsion polymerization of a second monomer composition in the presence of said core, said second monomer composition consisting essentially of:
 (a) a major amount of a principal monomer system; and
 (b) about 2% to 10% on the total second monomer composition of a latent crosslinking monomer;
the monomers of said first monomer composition being selected to provide a $T_g$ in said core of −20° C. or lower, and the monomers of said second monomer composition being selected to provide a $T_g$ in said shell of about 60° C. to about −10° C.

2. The textile treating composition of claim 1 wherein said latent crosslinking monomer is acrylamide, methacrylamide, N-methylol acrylamide, N-methylol methacrylamide, or any mixture of two or more thereof.

3. The textile treating comosition of claim 1 wherein said graftlinking monomer is an allyl, methallyl or crotyl ester of an alpha, beta-ethylenically unsaturated carboxylic acid.

4. The textile treating composition of claim 1 wherein said active crosslinking monomer is an alpha, beta-ethylenically unsaturated monocarboxylic acid ester of a polyhydric alcohol.

5. The textile treating composition of claim 1 wherein said principal monomer systems comprise at least one $C_1$-$C_8$ alkyl acrylate or a mixture comprising at least one $C_1$-$C_8$ alkyl acrylate and up to 20% by weight of at least one different, ethylenically unsaturated monomer copolymerizable with said alkyl acrylate.

6. The textile treating composition of claim 1 wherein the principal monomer system of the core comprises about 70-95% by weight of butyl acrylate and about 1-15% by weight of methyl methacrylate, based on total monomer weight.

7. The textile treating composition of claim 1 wherein said first monomer composition consists essentially of:
 70-95% by weight of a $C_1$-$C_8$ alkyl acrylate,
 0-15% by weight of a $C_1$-$C_8$ alkyl methacrylate,
 4-10% by weight of acrylamide or methacrylamide,
 1-5% by weight of allyl methacrylate, and
 0-2% by weight of itaconic acid;
and wherein said second monomer composition consists essentially of:
 40-70% by weight of a $C_1$-$C_8$ alkyl acrylate,
 20-50% by weight of a $C_1$-$C_8$ alkyl methacrylate,
 2-10% by weight of N-methylol acrylamide, N-methylol methacrylamide, or a mixture of acrylamide and N-methylol acrylamide, or a mixture of methacrylamide and N-methylol methacrylamide, and
 0-2% by weight of itaconic acid.

* * * * *